S. BAXENDALE.
Centrifugal-Machine.

No. 215,428.  Patented May 20, 1879.

WITNESSES.  INVENTOR.
Samuel Baxendale

UNITED STATES PATENT OFFICE

SAMUEL BAXENDALE, OF CAMBRIDGE, MASSACHUSETTS.

IMPROVEMENT IN CENTRIFUGAL MACHINES.

Specification forming part of Letters Patent No. 215,428, dated May 20, 1879; application filed March 13, 1878.

*To all whom it may concern:*

Be it known that I, SAMUEL BAXENDALE, of Cambridge, in the county of Middlesex and State of Massachusetts, have invented an Improvement in Hydro-Extractors, of which the following is a specification:

This invention has for its nature the following-described means for scouring, rinsing, and cleansing wool or other fiber or material; and consists in means for saturating the material to be cleansed with a cleansing-solution, by causing the basket containing the said material to be revolved in said solution, and afterward in revolving said basket in the upper part of the tank containing said solution, but not revolving in the solution, to free the basket from the cleansing-solution which it has taken up in revolving in the cleansing-liquid, as hereinafter described.

I am aware that the patent known as the "Henry Chapman patent" describes a machine employing a revolving basket surrounded by a stationary tank, and means for revolving said basket within the said tank.

I am also aware that the machine known as the "Weston machine," for wool-scouring, &c., uses a revolving basket surrounded by a stationary shell of peculiar construction, with peculiar operative mechanism for revolving said basket within the shell.

I am also aware that the patent granted Uhlinger, August 22, 1876, is for a device having the same general features—that is, a revolving basket surrounded by a stationary or fixed tank, and improved means for revolving said basket.

I am further aware that the patent to J. Aspinwall, No. 26,007, granted November 8, 1859, shows and describes a centrifugal sugar-machine, consisting of a perforated vessel for holding the sugar, and means for elevating and lowering the same in relation to a tank filled with water; but the same does not contain the essential features of my invention.

My invention relates not to the method of revolving the basket, as I can employ any of the well-known devices in use for so doing, but to the adjustable tank in connection with the basket.

Figure 1:
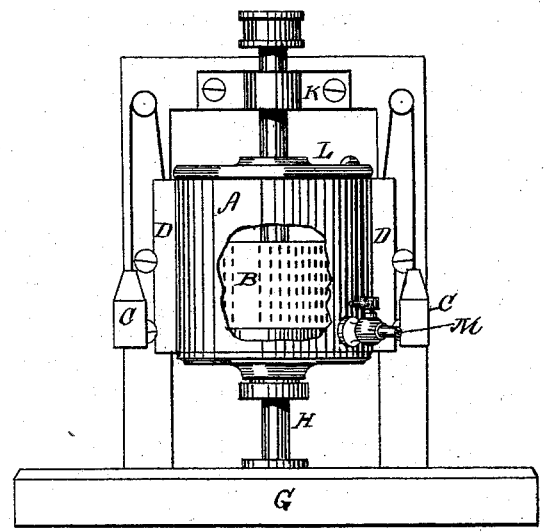
Figure 2:
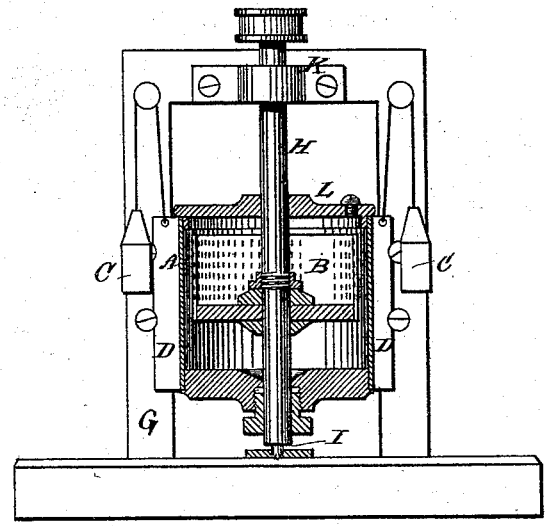

In the drawings, Figure 1 is an elevation of my machine, with a part of the tank broken away to expose the basket within. Fig. 2 is a vertical central section of the same.

The tank A, having a depth of about twice the height of the basket B, therein inclosed, is provided with any well-known means for vertical adjustment in relation to the basket.

I show as one means the weights C, acting to counterpoise the weight of the tank. The tank is further provided with the guides D, which slide in suitable ways in the frame G of the machine. The basket B is rigidly secured on the shaft H, which passes through the bottoms of the basket and tank, and is provided with bearings in the step I and in the frame at K, and is caused to revolve by any desirable means. The tank is provided with a cover, L, and the faucet M.

In operation, the tank is partly filled with the cleansing-solution employed, and the basket is filled with the material to be rinsed, scoured, or cleansed. The tank is then lifted, so that the material in the basket is thoroughly saturated with the said cleansing-solution while being slowly revolved therein. The tank is then lowered sufficiently to drop the cleansing-solution from contact with the basket, and the same is then caused to revolve more rapidly, to throw out all the cleansing-solution that may remain in the basket, in order to dry and rinse the material cleansed.

It will be seen that the tank is made deeper than the basket, in order that it may contain the cleansing-solution, and also act to receive that portion of the solution thrown out in drying the material after the tank has been lowered from the basket.

It will also be seen that naphtha, or any other inflammable agent having great affinity to grease, may be employed in cleansing with comparative safety, as the tank is covered to prevent evaporation, and the fluid is only exposed to the air and to evaporation during the time necessary to fill and empty the basket.

It will be observed, further, that naphtha, benzine, &c., employed cannot evaporate during the cleansing process, as the tank is tightly covered, and that this removes another objection to the use of naphtha or benzine as a cleansing agent.

When the cleansing material becomes inoperative from being saturated with grease, it is drawn off through the faucet either to a retort, where the naphtha may be distilled to be again used, or to some other convenient vessel.

I do not confine myself to moving the tank vertically in relation to the constantly-revolving basket, as the basket can be lowered in a stationary tank, revolved for a while in the cleansing-liquor, then elevated, and revolved again to free the same from the cleansing-solution, as both constructions secure the same result.

I claim as my invention and desire to secure by Letters Patent—

1. In a hydro-extractor or machine for cleansing, scouring, and rinsing wool or other articles, a shell or jacket provided with means for vertical adjustment in relation to a revolving basket inclosed therein, whereby the said basket may be first entirely saturated with the cleansing-liquor contained in the lower part of said shell or jacket, or may be freed from said liquor in the upper part of said jacket, substantially as and for the purpose described.

2. In a hydro-extractor or machine for scouring, rinsing, or cleansing wool or other articles, the combination of a movable tank, shell, or jacket, provided with means for vertical adjustment in relation to a revolving basket, with a revolving basket entirely inclosed within said tank, jacket, or shell, and adapted to freely revolve in any portion thereof, substantially as and for the purposes set forth.

SAMUEL BAXENDALE.

In presence of—
 E. A. M. CLARKE,
 JOHN E. WHEELER.